United States Patent [19]

Canfield et al.

[11] 4,157,788

[45] Jun. 12, 1979

[54] LOW FRICTION, MOVABLE, ROCKET NOZZLE

[75] Inventors: Alan R. Canfield, North Ogden; Lawrence C. Faupell, Logan; Stanley H. Cardall, Providence, all of Utah

[73] Assignee: Thiokol Corporation, Newtown, Pa.

[21] Appl. No.: 820,954

[22] Filed: Aug. 1, 1977

[51] Int. Cl.$^2$ .................. B64C 15/04; B64C 15/08
[52] U.S. Cl. ............................ 239/265.35; 244/3.22
[58] Field of Search .................. 102/105; 239/265.33, 239/265.35, 265.37, 265.39; 252/12, 12.4, 12.6; 308/238, DIG. 1; 428/421, 422; 244/3.22

[56] References Cited

U.S. PATENT DOCUMENTS

| 3,110,530 | 11/1963 | Herman | 308/238 |
| 3,401,887 | 9/1967 | Sheppard | 239/265.35 |
| 3,765,978 | 10/1973 | Matt | 308/238 |
| 3,912,172 | 10/1975 | Bolner | 239/265.35 |

*Primary Examiner*—Samuel W. Engle
*Assistant Examiner*—Edward F. Miles
*Attorney, Agent, or Firm*—Stanley A. Marcus; Edward E. McCullough

[57] ABSTRACT

A ball-and-socket, thrust nozzle for rockets has a movable member retained by a stationary member attachable to a rocket. The movable member includes a venturi throat and an expansion cone for the propulsive gases. At least one of the nozzle members has a spherical surface concentric about the center of rotation of the movable member. The other member bears against this spherical surface via a bearing seal in the form of a thin, narrow ring of lubricous material. The bearing seal is located in a position to support the axial blow-out load imposed by the propulsive gases. It is made of fibers of lubricous material, filled with a solid, lubricous resin; and it is bonded to a nozzle member either with the filler resin or with some other bonding agent. The side of the bearing seal that is bonded to the nozzle member may be reinforced with fibers having high tensile strength, woven into the lubricous fibers, or with a thin sheet of metal. The unbonded surface of the bearing seal is convex to minimize its area of contact with the other nozzle member, while having a relatively large bonding surface. The bearing seal functions as a low-friction bearing and also as a seal for containing the hot, erosive, propulsive gases of the rocket.

In a preferred embodiment, the fibers of the bearing seal are radially oriented by filament winding. This increases its strength by maximizing the density of the fibers therein and by orienting them so that they are always substantially paralell to the major travel of the surface against which it bears. For the latter reason, the coefficient of friction is also lowered; because the moving surface always moves esentially along the fibers.

7 Claims, 4 Drawing Figures

LOW FRICTION, MOVABLE, ROCKET NOZZLE

BACKGROUND OF THE INVENTION

This invention relates broadly to rocket nozzles; and, more specifically, it relates to movable thrust nozzles having special, low-friction bearing means. The invention herein described was made under or during the course of Contract N00123-73-C-0400 with the U.S. Navy.

Movable thrust nozzles have proved to be the most successful means for steering rockets. However, considerable difficulty has resulted from the fact that such nozzles must incorporate gastight seals capable of containing flaming, erosive gases under very high pressures and still be movable by light weight equipment over a practical deflection angle.

Spherical, metal-to-metal surfaces have been used for joining the parts of movable rocket nozzles, sometimes supported by gimbal mechanisms and sealed together with elastomeric rings. Such nozzles require high precision and sometimes galling between the metal surfaces becomes a problem. More recently, elastomeric bearings made of laminae of metal and elastomer alternately stacked and bonded together have been used to support the movable portion of the nozzle relative to the portion that is fixed to the rocket. Such bearings have been successful in effecting gastight seals while providing the capability of relative motion. However, considerable torque is necessary to deflect the movable portion of the rocket. Moreover, elastomeric bearings possess some of the properties of springs and resist being moved out of their neutral positions. This resistance is roughly proportional to the deflection angle, so that increasing force is required to move the nozzle as the deflection angle is increased.

Some low-friction bearings of the prior art include toroidal bladders filled with liquid. Others, such as those described in U.S. Pat. Nos. 3,912,172 and 3,401,887 are essentially oil bearings, wherein the two nozzle members are separated by annular chambers of pressurized fluid.

In general, these prior-art bearings have either been excessively heavy and bulky, or required large, hydraulic actuators.

SUMMARY OF THE INVENTION

The present invention, which overcomes some of these difficulties of the prior-art nozzles, is essentially a rocket nozzle having an annular, thin, narrow, lubricous, bearing pad between the bearing surfaces of the movable and stationary members, that functions also as a gastight seal. It is bonded either to the movable or to the fixed member of the nozzle; and it is positioned to support the axial, blow-out load impressed thereon by the propulsive gases. This not only permits a wide angle of deflection of the movable nozzle member, but also provides a light-weight, low-friction system that offers little resistance to actuators so that the actuators also may be smaller and less powerful. Hence, the entire system saves considerable weight that may be used more profitably to extend the payload and/or range of the rocket. At the same time, the lowered friction promotes greater responsiveness.

In one embodiment, the bearing seal is concavo-convex in form, as viewed in cross section, so that it has a large, concave surface for bonding to an annular bead on one nozzle member and a minimal area on its convex side for contact with the member against which it bears.

The bearing seal is made of fibers of lubricous material. Interstices between the fibers are filled with a solid resin, preferably having a lower melting point than that of the fibers.

The lubricous fibers are preferably installed by radial, filament winding. This permits a maximum density of fibers for maximum strength. Also, the primary relative motion of the nozzle members will be substantially parallel to the fibers, both taking advantage of the strength of fibers and further reducing friction.

Objects of the invention are to provide a movable rocket nozzle that is lighter in weight, more readily responsive, and that permits a wider angle of deflection than previous systems. Important features of the invention are that it is simple, reliable, and inexpensive. Other objects and advantages of the invention will become apparent as the following, detailed description is read with reference to the accompanying drawings. The same parts are designated by the same numbers throughout the disclosure.

DESCRIPTION OF THE PREFERRED EMBODIMENTS

Figure 1:
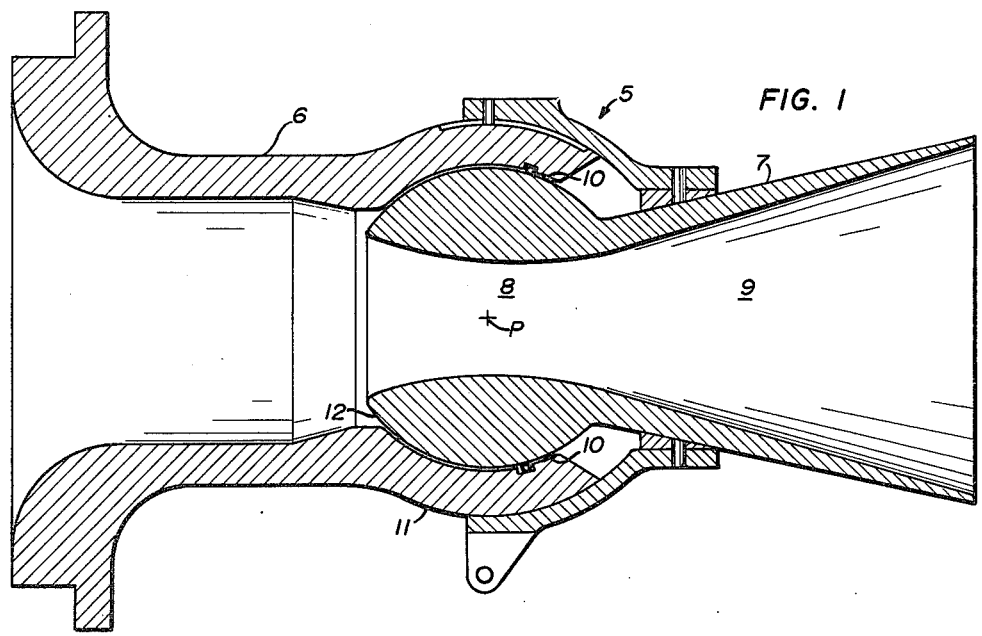
FIG. 1 is half of a longitudinal section of one embodiment of the invention.

As shown in FIG. 1, one type of rocket nozzle 5 is essentially a ball-and-socket joint wherein the stationary member 6 is to be fixed to a rocket and the movable member 7 is attached into the member 6 for omniaxial rotation within the limits of an imaginary cone. This movable member 7 includes a verturi throat 8 and an expansion cone 9.

The annular bearing seal 10 is bonded either to the movable member 7 or to the stationary member 6. However, it must bear against a spherical surface concentric about the of rotation P of the movable member 7. Also, it must be positioned to withstand the blow-out load impressed thereon by the propulsive gases of the rocket. Hence, it must be either forward or aft of the center P of rotation, depending on the design of the nozzle. In FIG. 1, it is shown bonded to the downstream side of the socket 11, adjacent the spherical surface of the ball 12. In most thrust nozzles, the movable portion of the nozzle is subjected to a considerable "blow-out" load imposed thereon by the propulsive gases of the operating rocket. In FIG. 1, the surface that must withstand this load is the aft surface of the socket 11. Hence, it is to this surface that the bearing seal 10 is bonded.

Figure 2:
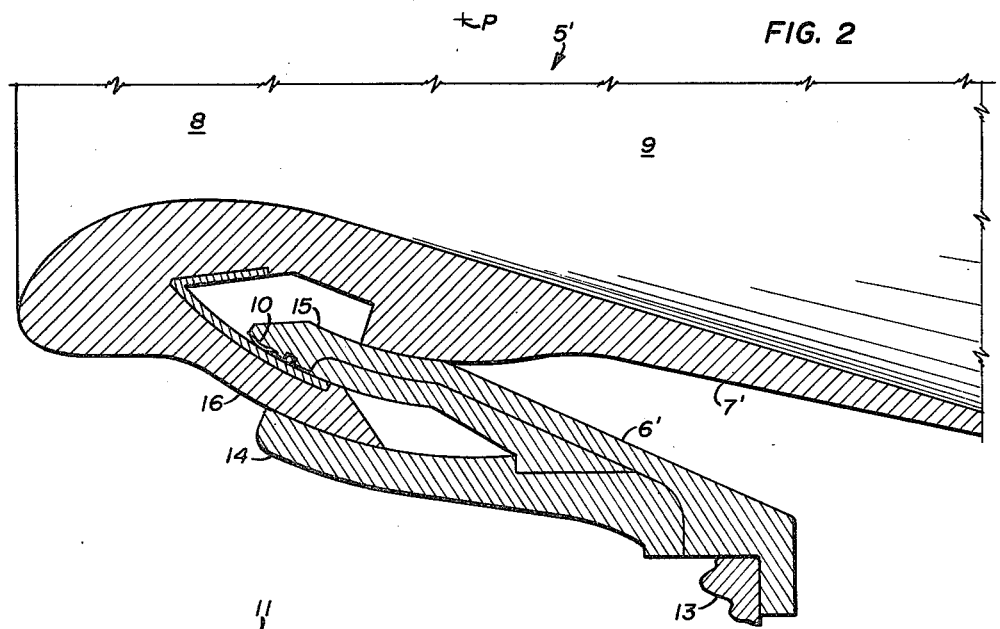
FIG. 2 is similar to FIG. 1, but shows an alternative embodiment of the invention.

Another common type of movable nozzle 5' is shown in FIG. 2. In this type of nozzle, the movable member 7' is partially submerged into the case 13 of the rocket. The stationary member 6' has the form of a truncated cone extending inwardly of the rocket and bifurcated into two concentric flanges 14 and 15 having spherical surfaces concentric about the center of rotation P. A guide flange 16, attached at its forward edge to the forward part of the movable nozzle member 7' and extending aftwardly therefrom, also has spherical surfaces concentric about the point P of rotation, and is inserted between the flanges 14 and 15 of the stationary member 6. In this embodiment of the invention, the bearing seal 10 is bonded to the outer surface, near the edge thereof, of the inner flange 15 of the stationary member 6'; and is forward of the center of rotation P.

Figure 3:
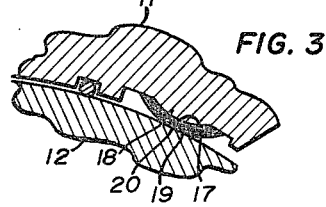
FIG. 3 is an enlarged detail of the bearing seal shown in FIG. 1.

In both embodiments described above, the bearing seal 10 is in the form of a thin, narrow ring, which may be constructed and bonded to a nozzle surface in a number of different ways. In the preferred embodiment shown in FIG. 3, the bearing seal 10 is concavo-convex, as viewed in cross section, the concave side 17 being being bonded over a bead 18 on one nozzle member and its convex bearing surface 19 contacting the other. This provides a broad area for bonding and a minimal area of contact with the member against which the bearing seal 10 bears. Also, the convex side 19 reduces shear stress on the bearing seal 10 that otherwise tends to break the bond thereof as the movable member 7 rotates against it. In addition, the convex surface 19 of the bearing seal is somewhat more readily compliant than if it were flat, and, hence, maintains a good seal with the movable member 7. The bead 18 helps to retain the bearing seal 10.

Figure 4:
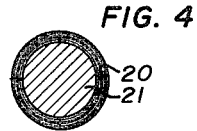
FIG. 4 is a cross section of the mandrel on which the bearing seal is manufactured.

As shown in FIG. 4, fibers 20 of polytetrafluoroethylene (Teflon) are filament wound on a cylindrical mandrel 21. When the appropriate thickness has been achieved, the mandrel is placed in a vacuum oven, where the interstices between the fibers 20 are filled with melted fluorinated ethylenepropylene (FEP Teflon), which has a lower melting point than polytetrafluoroethylene. The mandrel and fibers are then cooled until the FEP Teflon has solidified. The resin filled fibers are then separated into arcuate sections, as shown, machined to achieve the configuration shown in FIG. 4, and formed into rings having the desired dimensions.

The resulting, radial orientation of the fibers 20 is advantageous for several reasons: It maximizes the density of the fibers 20, and, hence, the strength of the bearing seal 10, because of the anisotropic nature of fibers. Also, if the distance from the center of rotation P of the nozzle member 5 to the plane of the bearing seal 10 is less than the radius of the bearing seal 10, then the maximum travel of a nozzle surface against the bearing seal 10 is always substantially along, or parallel to, the fibers 20. This not only uses the tensile strength of the fibers to best advantage, but also tends to lower the friction of the bearing surface even more.

Before bonding of the bearing seal 10, the bead 18 and its surrounding area are grit blasted. A molding piece, not shown, is then placed over the bearing seal 10 and the entire assembly is placed in an oven, where bonding is effected by heat and pressure. For large nozzles wherein it is impractical to use an oven, high tensile strength fibers, as of Nylon, may be woven into the Teflon fibers on the concave side of the bearing seal 10 to enhance its bondability. Then bonding can be effected by any of a number of conventional bonding agents. Alternatively, a thin sheet of metal, as of copper or brass, may be bonded to concave side of the bearing seal 10 with heat and pressure, and this metal, in turn, may be bonded to a nozzle member by a conventional bonding agent.

An invention has been described that advances the rocket nozzle art. Although the embodiments have been described quite specifically with regard to detail, it should be noted that many details may be changed without departing from the invention, as it is defined in the following claims. For example: the fibers 20 may be woven; other solid, lubricous materials may be used for construction of the bearing seal 10, such as succinonitrile or Dupont's "Kevlar," an aromatic polyamide; the bead 18 may be eliminated; and the bearing seal 10 may be planoconvex or flat.

The invention claimed is:

1. In a rocket nozzle having a movable member, which includes a venturi throat and an expansion cone, attached, via a ball-and-socket joint, to an annular, stationary member attachable to a rocket, the improvement comprising a thin, narrow, annular bearing seal made of lubricous fibers filled with a solid, lubricous resin, having a convex bearing surface and its other surface being fixed to one of the nozzle members, the bearing surface positioned to bear against a spherical surface of the other member and to support an axial blow-out load impressed on the movable member by propulsive gases of a rocket, whereby the bearing seal functions both as a low-friction bearing and as a gastight seal for containing hot, erosive gases of a rocket.

2. The rocket nozzle of claim 1 wherein the fibers of the bearing seal are oriented substantially radially therein in partial loops, so that the greatest relative sliding motion of the bearing seal on the nozzle member against which it bears occurs substantially lengthwise of the fibers to take advantage of the tensile strength thereof and so that friction is further reduced.

3. The rocket nozzle of claim 1 wherein the fibers of the bearing seal are made of polytetrafluoroethylene.

4. The rocket nozzle of claim 1 wherein the solid resin that fills the fibers of the bearing seal is fluorinated ethylenepropylene.

5. The rocket nozzle of claim 1 wherein the movable member includes a ball-type, spherical surface and the stationary member includes a socket-type, spherical surface, both adjacent and concentric about the center of rotation, and wherein the bearing seal is bonded to the socket surface aft of the center of rotation.

6. In a rocket nozzle having a movable member that defines a venturi throat and an expansion cone for exhausting propulsive gases, attached via a ball-and-socket joint to an annular stationary member attachable to a rocket aft closure, the improvements comprising:
   a thin, narrow, annular bearing seal comprising lubricous fibers filled with solid, lubricous resin and being concavo-convex as viewed in cross section, the convex surface being a bearing surface in sliding contact with a spherical surface of one of the nozzle members; and
   an annular bead, fixed to the other nozzle member concentric about the axis of the nozzle, that fits the concave surface of the bearing seal for retention thereof, the bearing seal being bonded over the bead, and the bead and bearing seal being positioned to support the movable member of the nozzle against blow-out loads impressed thereon by rocket gases.

7. A low-friction, movable, rocket nozzle comprising:
   a hollow, truncated cone;
   means on the larger end of the cone for mounting it to the aft closure of a rocket so that the cone extends inwardly thereof;
   a thin, narrow, annular bearing seal fixed to the smaller end portion of the cone and comprising lubricous fibers filled with solid lubricous resin and having a convex bearing surface;

a hollow, movable nozzle member, positioned inside the cone, defining a venturi throat and an expansion cone for exhausting propulsive gases of a rocket; and an annular, guide flange surrounding the movable member, fixed thereto, extending aftwardly, and having a partial, spherical, inner surface in sliding contract with the convex bearing surface of the bearing seal.

* * * * *